United States Patent Office 3,012,150
Patented Dec. 5, 1961

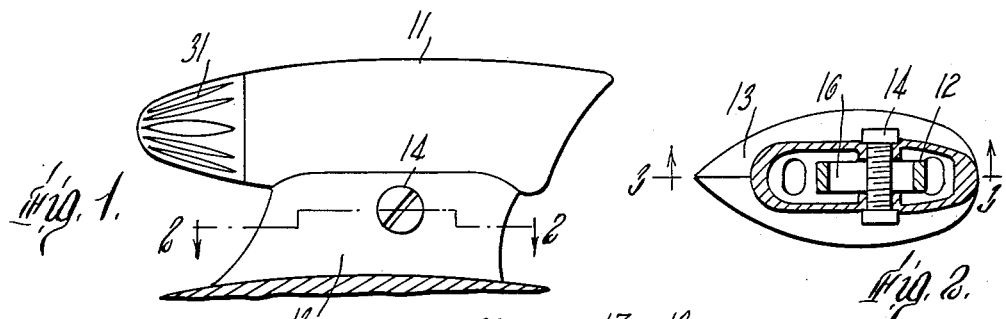
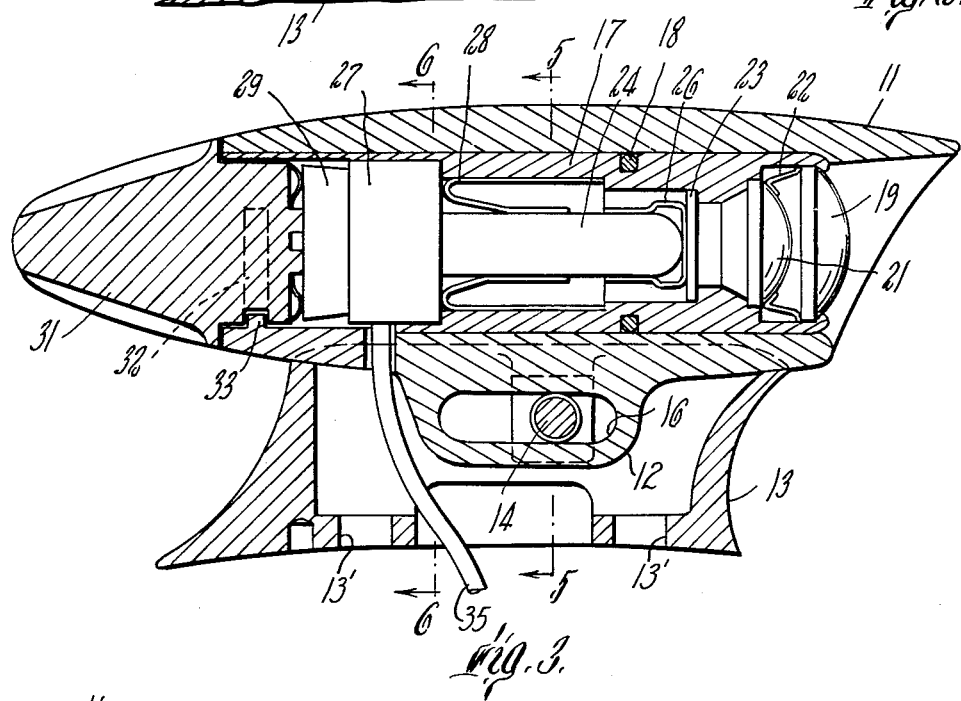
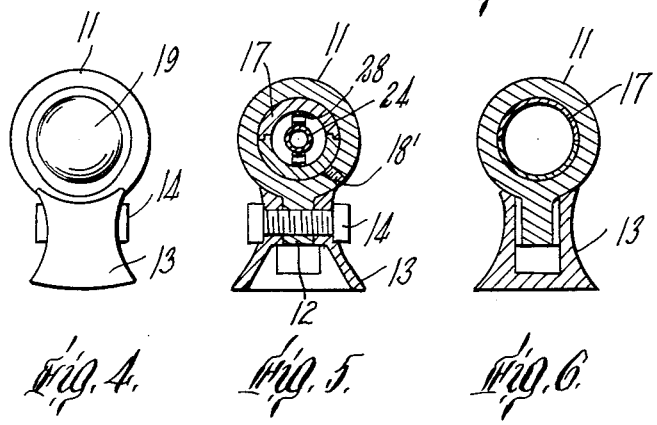
Inventors
E. Craig Thomson
Phillip J. Cade
by Robert S. Toperzer Atty.

3,012,150
HEADLIGHT SENSING DEVICE FOR AUTOMOBILES
Elihu Craig Thomson, Wellesley, and Phillip J. Cade, Winchester, Mass., assignors to Electronics Corporation of America, Cambridge, Mass., a corporation of Massachusetts
Filed Oct. 16, 1959, Ser. No. 846,891
4 Claims. (Cl. 250—239)

This invention relates generally to photosensitive devices and more particularly it is concerned with a photosensitive device to control automobile headlight beams in response to light from another automobile in the vicinity.

It is an object of the invention to provide a highly compact headlight sensing device for automobiles.

It is another object to provide a headlight sensing device which is made up of parts that are relatively easy to make and to assemble.

It is a further object of the invention to provide a headlight sensing device in which the appearance of the outer shell or body can be readily changed, for different models of automobiles, for example, without the need for any changes being made in the other parts of the device.

The novel features of the invention together with further objects and advantages will become apparent from the following detailed description and the drawing to which it refers.

In the drawing:

FIG. 1 is a view in elevation of the sensing device according to the present invention;

FIG. 2 is a sectional view of the device taken on line 2—2 of FIG. 1;

FIG. 3 is a sectional view of the device taken on line 3—3 of FIG. 2 and drawn on an enlarged scale;

FIG. 4 is a front end view of the device, and

FIGS. 5, 6 are sectional views taken on lines 5—5 and 6—6 of FIG. 3 and drawn to the same scale as FIGS. 1, 2 and 4.

With reference now to the drawing, it will be observed that the sensing device according to the present invention includes a hollow body 11 exhibiting an attractive streamlined appearance. Depending from the body, as an integral part thereof, is a lug 12 which is hidden by a mounting bracket 13. Mounting bracket 13 is formed with spaced upstanding flanges to support the body with the lug in between. An adjusting screw 14 is provided to tighten the flanges against the lug which has an elongated hole 16 through which the adjusting screw passes. Accordingly, positional adjustments of the body can be made when the screw is loosened. There are also provided mounting holes 13' in the web portion of the mounting bracket in order to mount the device in an automobile, for example, on the dash immediately adjacent the windshield.

Disposed inside the body 11 is a tubular insert 17 made up of two interfitting halves. These are clamped together by a ring 18 retained in a circumferential groove, and a set screw 18' is threaded through through the body and against the insert to maintain it in fixed position (FIG. 5). The insert, in turn, serves to hold the functional parts of the device which are as follows.

At the front of the device is a first condensing lens 19 and adjacent thereto is a second condensing lens 21.

A spring 22 aids in holding these lenses in place, that is in spaced relation to one another. Behind the second lens is an apertured mask 23, and behind the mask is a photoconductive element 24 whereby an electrical signal is produced in response to a change in the amount of light transmitted by the lenses and the aperture in the mask. Preferably the photoconductive element is of the cadmium selenide type, its general mode of construction and operation being well known to those skilled in the art. A spring 26 is pressed over the element 24 as shown to hold the mask in place, and another spring 28 is provided between the element and the inner wall of the insert to maintain the element centered therein.

Electrical connections to the element are made by way of a terminal block 27 to which is also connected a potentiometer, having a stationary part 29, through which the photoconductive element 24 is connected to the switching circuits which control the headlights, as disclosed in said copending application. The potentiometer is located immediately in back of the terminal block for convenient connection thereto, its rotary part being designated by the numeral 31. As shown, this rotary part includes an integral knob portion which projects axially from the rear of the insert and which in outward appearance is designed to complement the body 11. Thus the knob portion immediately adjacent to the body is seen to have a matching diameter which gradually becomes smaller following the same curve as is exhibited by the body outline. In addition, there is a groove 32 in the rotary part which extends part way around its circumference at a point which is hidden from view by the insert 17. A radial projection 33 from the insert 17 rides in the groove 32 and serves as a stop for the potentiometer. Finally, there is shown a connecting line 35 leading from the terminal block to the electrical apparatus with which the sensing device of the present invention is employed. The nature and mode of operation of this apparatus is described in detail in the copending application of Phillip J. Cade and E. Craig Thomson Serial No. 846,890, filed October 16, 1959, now Patent No. 2,963,622.

What is claimed according to the present invention is:

1. A photosensitive device for automobiles comprising an elongated hollow body which is generally cylindrical in section, a tubular insert disposed inside said body with its outer wall closely fitted to the inner wall of said body, a lens system mounted in one end of said insert, a photoconductor mounted adjacent said lens system to receive light transmitted thereby and to produce electrical signals in response to changes in the amount of light received, and a rotatable control knob, shaped to conform in outline to the outline of said body, mounted on the other end of the insert for controlling the output of the photoconductor.

2. A photosensitive device for automobiles comprising an elongated hollow body which is generally cylindrical in section, a tubular insert disposed inside said body with its outer wall closely fitted to the inner wall of said body, said insert being formed with two interfitting halves which are half round in outline, a lens system clamped in place between the halves of said insert at one end thereof, a photoconductor mounted adjacent said lens system to receive light transmitted thereby and to produce electrical signals in response to changes in the amount of light received, and a rotatable control knob, shaped to conform in outline to the outline of said body, mounted on the other end of the insert for controlling the output of the photoconductor.

3. A photosensitive device for automobiles comprising an elongated hollow body which is generally cylindrical in section, a tubular insert disposed inside said body with its outer wall closely fitted to the inner wall of said body, said insert being formed with two interfitting halves which are half round in outline, a lens system clamped in place between the halves of said insert at one end thereof, a photoconductor mounted adjacent said lens system to receive light transmitted thereby and to produce electrical signals in response to changes in the amount of light received, and an adjustable resistor electrically connected to said photoconductor to control the output thereof and having a stationary part and a movable part, said stationary part being mounted wholly within said insert, and said movable part projecting axially therefrom to form a knob with an exterior wall closely adjacent the wall of said body.

4. A photosensitive device for automobiles comprising an elongated hollow body which is generally cylindrical in section, said body having a depending lug with an elongated hole therein, a tubular insert disposed inside said body with its outer wall closely fitted to the inner wall of said body, said insert being formed with two interfitting halves which are half round in outline, a lens system clamped in place between the halves of said insert at one end thereof, a photoconductor mounted adajacent said lens system to receive light transmitted threreby and to produce electrical signals in response to changes in the amount of light received, a snap ring to hold the halves of said insert together, an adjustable resistor electrically connected to said photoconductor to control the output thereof and having a stationary part and a movable part, said stationary part being mounted wholly within said insert and said movable part projecting axially therefrom to form a knob with an exterior wall closely adjacent the wall of said body, a mounting bracket having upstanding flanges provided with clearance holes, and an adjusting screw passing through said elongated and clearance holes to clamp said lug between said flanges.

References Cited in the file of this patent

UNITED STATES PATENTS

| | | |
|---|---|---|
| 2,562,538 | Dyer | July 31, 1951 |
| 2,712,611 | Nyman | July 5, 1955 |
| 2,762,930 | Onksen et al. | Sept. 11, 1956 |
| 2,815,454 | Gilbert | Dec. 3, 1957 |